US008498736B2

(12) United States Patent
Nakazumi

(10) Patent No.: US 8,498,736 B2
(45) Date of Patent: Jul. 30, 2013

(54) COIN HANDLING MACHINE

(75) Inventor: Keisuke Nakazumi, Hyogo (JP)

(73) Assignee: Glory Ltd., Himeji-Shi, Hyogo (JP)

( * ) Notice: Subject to any disclaimer, the term of this patent is extended or adjusted under 35 U.S.C. 154(b) by 373 days.

(21) Appl. No.: 12/735,555

(22) PCT Filed: Jan. 29, 2008

(86) PCT No.: PCT/JP2008/051239

§ 371 (c)(1),
(2), (4) Date: Jul. 27, 2010

(87) PCT Pub. No.: WO2009/095987

PCT Pub. Date: Aug. 6, 2009

(65) Prior Publication Data

US 2010/0312378 A1 Dec. 9, 2010

(51) Int. Cl.
*G06F 7/00* (2006.01)
*G07F 9/10* (2006.01)
*G07D 3/00* (2006.01)

(52) U.S. Cl.
USPC ........... 700/223; 700/228; 700/231; 700/232; 700/230; 453/3; 194/216; 194/350

(58) Field of Classification Search
None
See application file for complete search history.

(56) References Cited

U.S. PATENT DOCUMENTS 4,436,102 A * 3/1984 Kokubo et al. ................. 453/17
5,400,891 A * 3/1995 Winstanley ................... 194/350
6,637,576 B1 * 10/2003 Jones et al. ................... 194/216
2004/0231956 A1 11/2004 Adams et al.
2004/0259490 A1 * 12/2004 Hino et al. ........................ 453/3
2006/0183418 A1 * 8/2006 Umeda .......................... 453/12

FOREIGN PATENT DOCUMENTS

JP 6-84036 3/1994
JP 2003-030710 1/2003
JP 2004-265066 9/2004
JP 2004-272461 9/2004
JP 2004265066 A * 9/2004
JP 2005-202491 7/2005
JP 2007-279907 10/2007

OTHER PUBLICATIONS

European Search Report (Application No. 087040481—PCT/JP2008/051239) (7 pages—dated Nov. 14, 2012).

* cited by examiner

*Primary Examiner* — Gene Crawford
*Assistant Examiner* — Yolanda Jones
(74) *Attorney, Agent, or Firm* — Renner, Kenner, Greive, Bobak, Taylor & Weber

(57) ABSTRACT

The present invention provides a coin handling machine 11 which can properly and effectively use the capacities of the coin storing units 25.
Coins to be transported in the deposit transport unit 22 are recognized by a recognition unit 23, sorted by sorting by a plurality of sorting units 24 using electric driving units according to recognition results, and stored in coin storing units 25 of a plurality of stackers 26. Each stacker 26 is provided with two coin storing units 25 with different capacities. To coins with a large diameter or thickness or coins of a sort the handling amount of which is large, a coin storing unit 25 with a large capacity is assigned to prevent capacity shortage. To coins with a small diameter or thickness or coins of a sort the handling amount of which is small, a coin storing unit 25 with a small capacity is assigned to prevent the capacity from becoming excessive. The capacities of the coin storing units 25 can be properly and effectively used.

6 Claims, 10 Drawing Sheets

COIN HANDLING MACHINE

TECHNICAL FIELD

The present invention relates to a coin handling machine which sorts and stores coins.

BACKGROUND ART

Conventionally, for example, to accurately and quickly deliver customers cash and receive them at a store, coin handling machines such as automatic change dispensers which are electrically connected to POS registers and capable of automatically depositing and dispensing coins have been developed.

In this coin handling machine, a coin inlet into which coins are input is provided on the front side upper portion of the machine body, and a coin dispensing outlet for dispensing coins is provided on the front face of the machine body.

A feeding unit which feeds input coins one by one is provided on the bottom portion of the coin inlet, and a deposit transport unit which transports coins in succession to the feeding unit is provided. The deposit transport unit is provided with a recognition unit which recognizes coins to be fed, and a plurality of sorting units which sort fed coins by denomination according to the results of recognition by the recognition units along the sorting path region of the deposit transport unit toward the rear side of the machine body. The sorting units are enabled to sort coins by gates which are driven by a solenoid.

Below the sorting path region of the deposit transport unit, a plurality of coin storing units which store coins sorted by denomination by the plurality of sorting units are juxtaposed along the front-rear direction of the machine body. These coin storing units can eject stored coins one by one.

On the lateral portion of the plurality of coin storing units, a dispensing transport unit which transports and dispenses coins ejected from the coin storing units to the coin dispensing outlet is provided (for example, refer to patent document 1).

The plurality of coin storing units have the same width and the same capacity for storing coins.

The plurality of coin storing units are formed by dividing the interior of an integral-type stacker into a plurality of sections. Therefore, when any one of the coin storing units has a problem, the whole integral-type stacker is detached. To detach this integral-type stacker, the components of the inlet and the feeding unit on the front side of the stacker are detached and the deposit transport unit at the upper side of the stacker is detached and the stacker is exposed upward to pull out the whole integral-type stacker upward.

The positional relationships of denominations to be stored in the plurality of coin storing units can be changed. In this case, denominations to be sorted by the sorting units are changed and set, and coins stored in the coin storing units before being changed are all taken out so as to prevent denominations before and after being changed from mixing.

Patent Document 1: Japanese Laid-Open Patent Publication No. 2007-279907 (page 6, FIG. 1)

DISCLOSURE OF THE INVENTION

Problem to be Solved by the Invention

The diameters and thicknesses of coins to be stored in the coin storing units of the stacker and the handling amounts of coin denominations are various.

If the capacities of the coin storing units of the stacker are the same as in the conventional cases, when storing coins with a large diameter or thickness or coins of a sort the handling amount of which is large, the coin storing unit easily becomes full and the capacity may be short, and on the other hand, when storing coins with a small diameter or thickness or coins of a sort the handling amount of which is small, the capacity of the coin storing unit becomes excessive.

For storing coins with a large diameter or thickness or coins of a sort the handling amount of which is large, all coin storing units must have large capacities, however, this increases the size of the machine.

The present invention has been made in view of these circumstances, and an object thereof is to provide a coin handling machine which can properly and effectively use the capacities of the coin storing units without an increase in the size of the machine.

Means to Solve the Problems

A coin handling machine of the present invention includes: a deposit transport unit which transports coins; a recognition unit which recognizes coins to be transported by the deposit transport unit; a plurality of sorting units provided along the deposit transport unit and having electric driving units, which sort coins being transported by the deposit transport unit according to results of recognition by the recognition unit; and a plurality of stackers each of which has two or more coin storing units for storing coins sorted by the sorting units corresponding to the sorting units, where the capacities of the coin storing units are different from each other.

A coin handling machine of the present invention includes: a stacker housing unit which houses the plurality of stackers, and the plurality of stackers have the same lateral width and are individually attachable to and detachable from the stacker housing unit.

A coin handling machine of the present invention includes: an attaching unit which makes the stackers attachable to and detachable from the stacker housing unit, and positions receiving ports for receiving coins in the coin storing units in a state where the stackers are attached corresponding to the sorting units.

A coin handling machine of the present invention includes: a setting unit which sets correspondences between the sorting units and coin sorting denominations; a memory unit which stores the correspondences between the sorting units and the coin sorting denominations set by the setting unit; and a control unit which makes the sorting units sort coins transported by the transport unit according to results of recognition by the recognition unit based on the correspondences between the sorting units and the coin sorting denominations stored in the memory unit.

A coin handling machine of the present invention includes: a plurality of stackers each of which has two or more coin storing units with coin storing capacities different from each other, and ejection mechanisms which allow coins stored in the respective coin storing units to be ejected; and a dispensing transport unit which receives and transports coins ejected from the coin storing units of the stackers.

A coin handling machine of the present invention includes: a stacker housing unit which houses the plurality of stackers, and the plurality of stackers have the same lateral width, and are individually attachable to and detachable from the stacker housing unit.

A coin handling machine of the present invention includes: a deposit transport unit which transports coins; a recognition unit which recognizes coins to be transported by the deposit transport unit; a plurality of sorting units provided along the deposit transport unit and having electric driving units, which sort coins being transported by the deposit transporting unit corresponding to the coin storing units of the stackers according to results of recognition by the recognition unit; and an attaching unit which enables the stackers to be detachably attached to the stacker housing unit, and positions receiving ports for receiving coins of the coin storing units in a state where the stackers are attached corresponding to the sorting units.

A coin handling machine of the present invention includes: a setting unit which sets correspondences between the sorting units and coin sorting denominations; a memory unit which stores the correspondences between the sorting units and the coin sorting denominations set by the setting unit; and a control unit which makes the sorting units sort coins being transported by the deposit transporting unit according to results of recognition by the recognition unit based on the correspondences between the sorting units and the coin sorting denominations stored in the memory unit.

A coin handling machine of the present invention includes: a deposit transport unit which transports coins; a recognition unit which recognizes coins to be transported by the deposit transport unit; a plurality of sorting units provided along the deposit transport unit and having electric driving units, which sort coins being transported by the deposit transport unit according to results of recognition by the recognition unit; and a plurality of stackers which have coin storing units for storing coins sorted by the sorting units corresponding to the sorting units, where the coin storing units have capacities different from each other.

A coin handling machine of the present invention includes: a stacker housing unit which houses the plurality of stackers, and the plurality of stackers are individually attachable to and detachable from the stacker housing unit.

A coin handling machine of the present invention includes: an attaching unit which makes the stackers attachable to and detachable from the stacker housing unit, and positions receiving ports for receiving coins of the coin storing units corresponding to the sorting units in the state where the stackers are attached.

A coin handling machine of the present invention includes: a setting unit which sets correspondences between the sorting units and coin sorting denominations; a memory unit which stores the correspondences between the sorting units and the coin sorting denominations set by the setting unit; and a control unit which makes the sorting units sort coins being transported by the deposit transport unit according to results of recognition by the recognition unit based on the correspondences between the sorting units and the coin sorting denominations stored in the memory unit.

Effects of the Invention

With a coin handling machine of the present invention, the capacities of the two or more coin storing units of each of the plurality of stackers are made different from each other and coins sorted by the plurality of sorting units using the electric driving units are stored in the coin storing units of the stackers, so that the capacities of the coin storing units can be set so as to correspond to the diameters and thicknesses of the coins or the handling amounts of the coin denominations, so that the capacities of the coin storing units can be properly and effectively used without an increase in the size of the machine.

With the coin handling machine of the present invention, the plurality of stackers have the same width and are individually attachable to and detachable from the stacker housing unit, so that the positions of the stackers can be arbitrarily changed.

With the coin handling machine of the present invention, in the state where the stackers attachable to and detachable from the stacker housing unit are attached, receiving ports for receiving coins of the coin storing units of the stackers are positioned corresponding to the sorting units by an attaching unit.

With the coin handling machine of the present invention, the coin handling machine includes: a setting unit which sets correspondences between the sorting units and coin sorting denominations; a memory unit which stores the correspondences between the sorting units and the coin sorting denominations set by the setting unit; and a control unit which makes the sorting units sort coins transported by the transport unit according to results of recognition by the recognition unit based on the correspondences between the sorting units and the coin sorting denominations stored in the memory unit.

With a coin handling machine of the present invention, the capacities of the two or more coin storing units of the plurality of stackers are made different from each other, so that the capacities of the coin storing units can be set so as to correspond to the diameters and thicknesses of the coins or the handling amounts of the coin denominations, so that the capacities of the coin storing units can be properly and effectively used without an increase in the size of the machine.

With the coin handling machine of the present invention, the plurality of stackers have the same width and are individually attachable to and detachable from the stacker housing unit, so that the positions of the stackers can be arbitrarily changed.

With the coin handling machine of the present invention, in the state where the stackers attachable to and detachable from the stacker housing unit are attached, receiving ports for receiving coins of the coin storing units of the stackers are positioned corresponding to the sorting units by the attaching unit.

With the coin handling machine of the present invention, correspondences between the sorting units and coin sorting denominations are set by the setting unit, and by changing the positions of the stackers, the positional relationship between the sorting units and stackers and the coin sorting denominations can be easily changed without taking out coins stored in the coin storing units of the stackers.

With a coin handling machine of the present invention, the capacities of the coin storing units of the plurality of stackers are made different from each other and coins sorted by the plurality of sorting units using the electric driving units are stored in the coin storing units of the stackers, so that the capacities of the coin storing units can be set so as to correspond to the diameters and thicknesses of the coins or the handling amounts of the coin denominations, so that the capacities of the coin storing units can be properly and effectively used without an increase in the size of the machine.

With the coin handling machine of the present invention, the plurality of stackers are individually attachable to and detachable from the stacker housing unit, so that the positions of the stackers can be arbitrarily changed.

With the coin handling machine of the present invention, in the state where the stackers attachable to and detachable from the stacker housing unit are attached, receiving ports for receiving coins of the coin storing units of the stackers can be positioned corresponding to the sorting units by the attaching unit.

With the coin handling machine of the present invention, correspondences between the sorting units and coin sorting denominations are set by the setting unit, and by changing the positions of the stackers, the positional relationships between the sorting units and stackers and the coin sorting denominations can be easily changed without taking out coins stored in the coin storing units of the stackers.

REFERENCE NUMERALS

Figure 1:
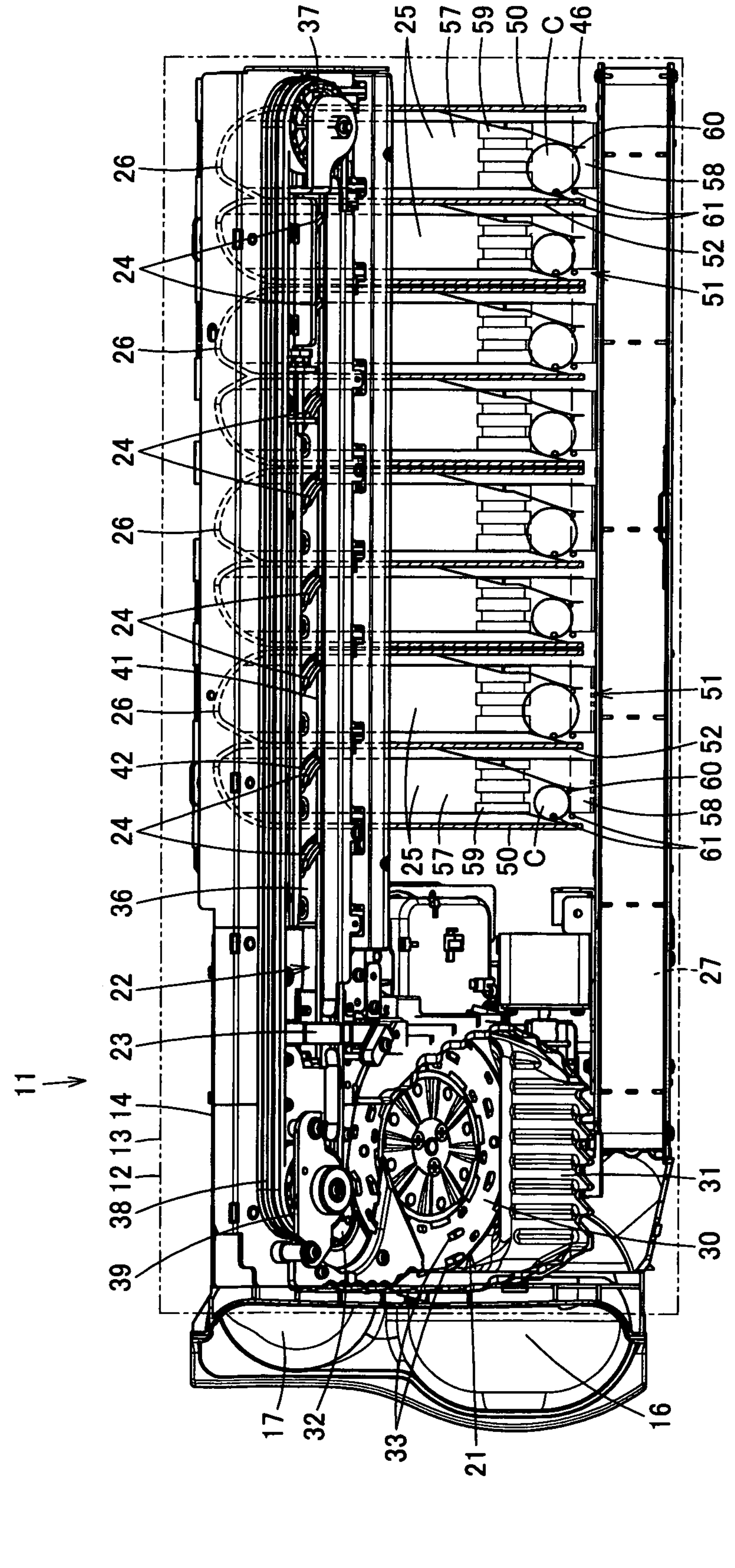
FIG. 1 is a plan view showing an internal structure of a coin handling machine according to a first embodiment of the present invention.

11 Coin handling machine
22 Deposit transport unit
23 Recognition unit
24 Sorting unit
25 Coin storing unit
26 Stacker
27 Dispensing transport unit
43 Electric driving unit
46 Stacker housing unit
51 Ejection mechanism
53 Receiving port
71 Control unit
73 Memory unit
74 Setting unit

BEST MODE FOR CARRYING OUT THE INVENTION

Hereinafter, embodiments of the present invention will be described with reference to the drawings.

A first embodiment is shown in FIG. 1 to FIG. 11.

Figure 9:
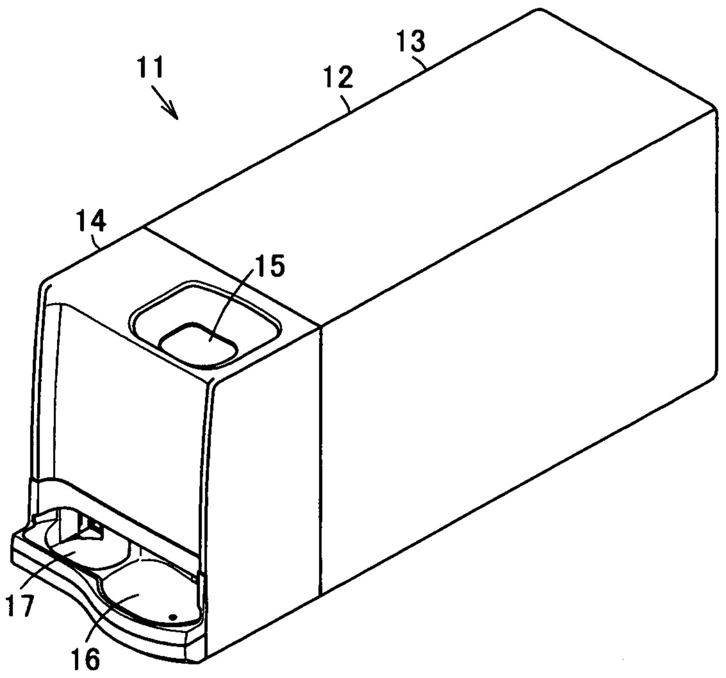
FIG. 9 is a perspective view of the same coin handling machine.

FIG. 9 is a perspective view of a coin handling machine 11. This coin handling machine 11 is electrically connected to, for example, a POS register, and can be used as an automatic change dispenser capable of automatically depositing and dispensing coins.

The machine body 12 of the coin handling machine 11 includes a frame body 13 having a front face opened and a main body unit 14 capable of being drawn out from the front face of the frame body 13.

A coin inlet 15 into which coins are input is formed on the upper face of the main body unit 14. On the front face right side of the main body unit 14, a coin dispensing outlet 16 from which coins are dispensed from the inside of the machine body 12 is formed, and on the front face left side of the main body unit 14, a reject port 17 to which coins unacceptable into the machine body 12 are returned is formed.

Figure 2:
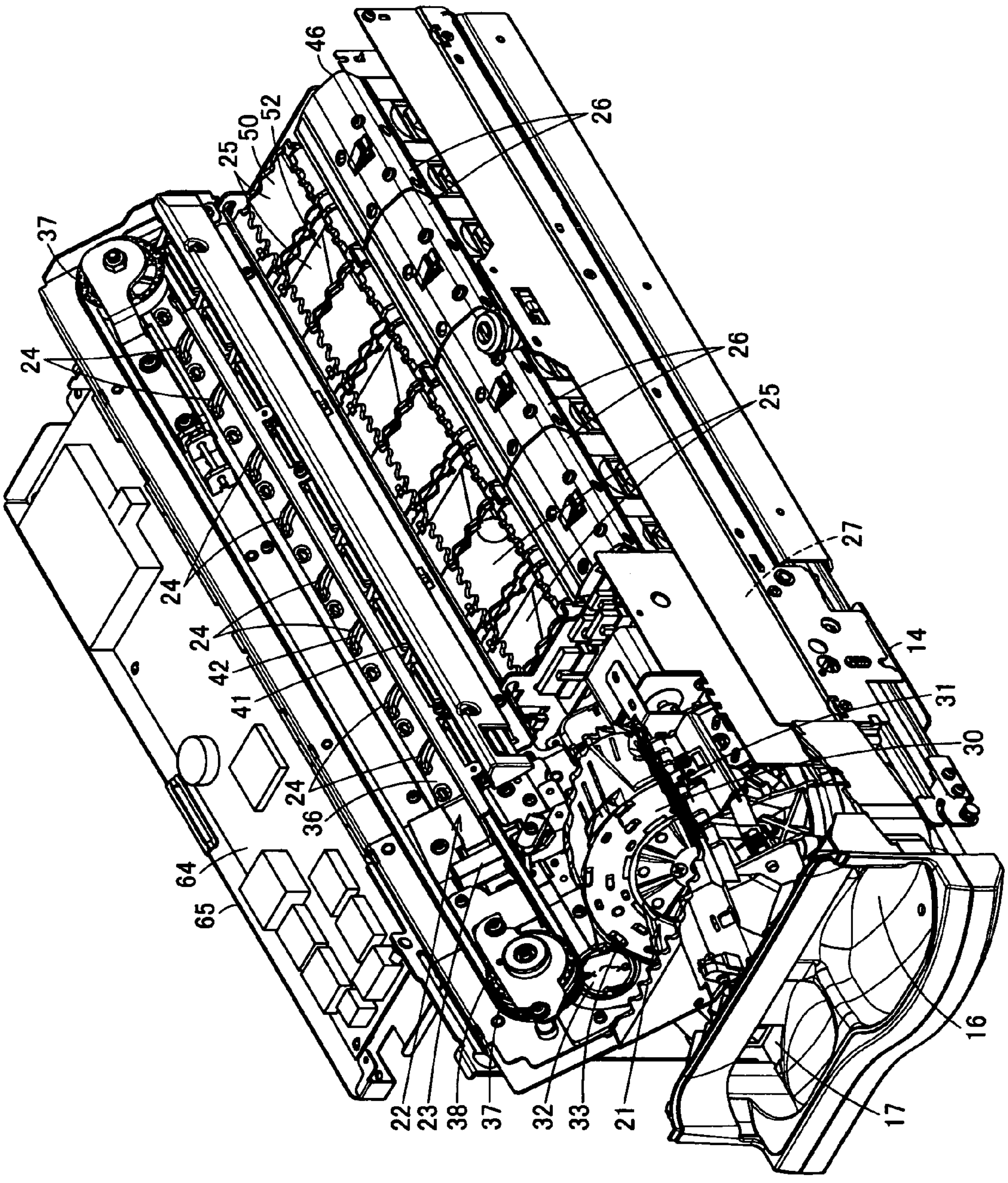
FIG. 2 is a perspective view showing the internal structure of the same coin handling machine.
Figure 3:
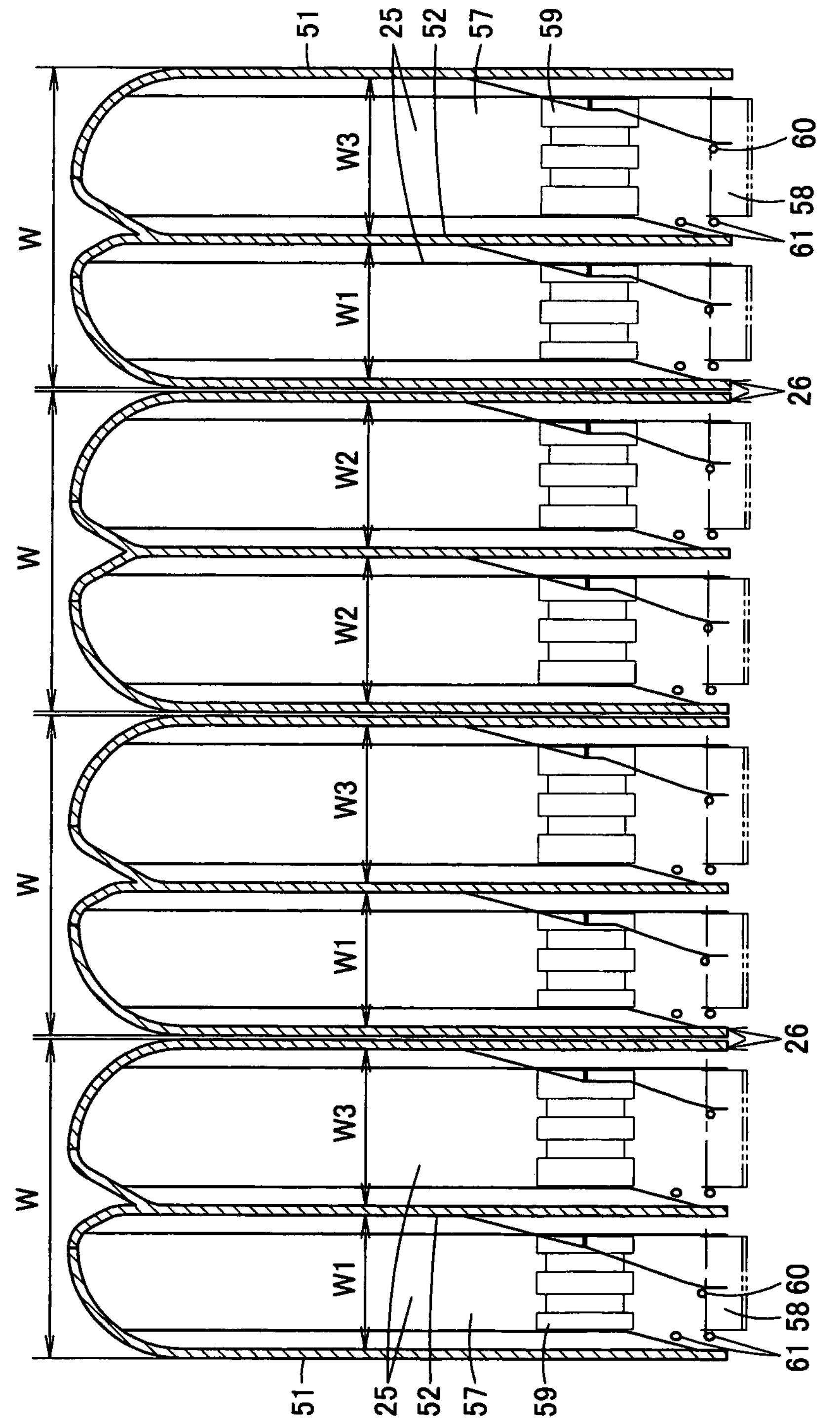
FIG. 3 is a plan view showing the dimensional relationship of stackers and the coin storing units of the stackers of the same coin handling machine.
Figure 4:
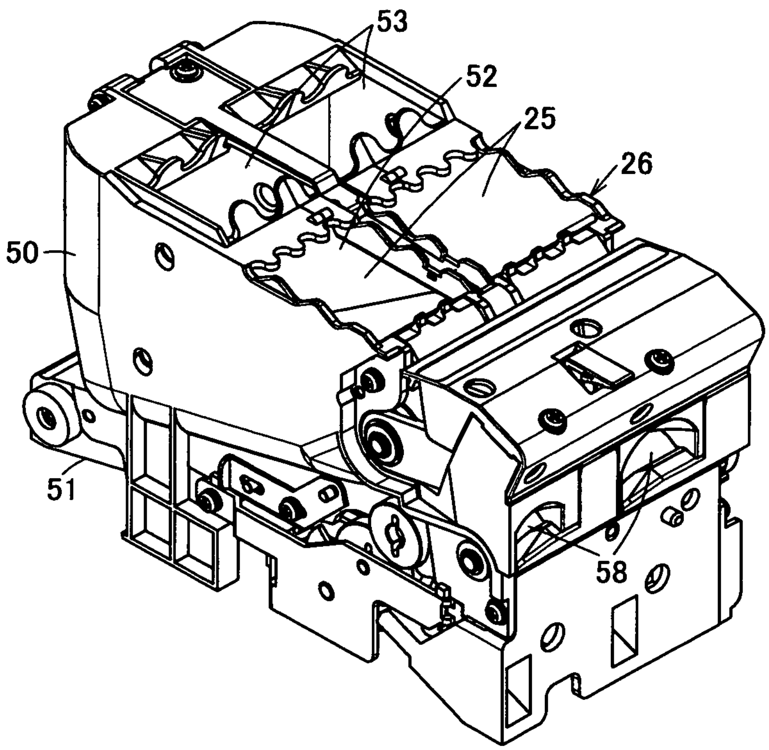
FIG. 4 is a perspective view of the same stacker.

Next, as shown in FIG. 1 and FIG. 2, the main body unit 14 includes a feeding unit 21 which receives coins (shown by the reference symbol C in the figures) input from the coin inlet 15 and feeds the coins one by one, a deposit transport unit 22 which transports coins fed from the feeding unit 21 from the front side to the rear side at the left side upper portion of the main body unit 14, a recognition unit 23 which recognizes coins to be transported by the deposit transport unit 22, a plurality of sorting units 24 which sort coins being transported by the deposit transport unit 22 by sorting according to results of recognition by the recognition unit 23, a plurality of stackers 26 having coin storing units 25 which are disposed in order from the front side to the rear side of the machine body 12 and allow coins sorted by the sorting units 24 to be ejected one by one rightward of the main body unit 14, and a dispensing transport unit 27 which is disposed at the right side lower portion of the machine body 12 and transports coins ejected from the coin storing units 25 to the coin dispensing outlet 16 positioned ahead.

The feeding unit 21 includes a rotary disk 30 which rotates around a rotation axis at a position inclined at a predetermined angle with respect to the horizontal direction, a hopper 31 which pools coins not aligned between the hopper and the surface of the rotary disk 30, and a delivery disk 32 which delivers coins one by one from the upper portion of the rotary disk 30 to the deposit transport unit 22.

The rotary disk 30 is inclined so that the left side becomes higher and the right side becomes lower as viewed from the front face of the machine body 12, and is rotated by driving of a motor in a feeding rotating direction (counterclockwise in FIG. 1 and FIG. 2) to feed coins to the deposit transport unit 22. On the surface of the rotary disk 30, a plurality of picking-up members 33 projecting from the surface of the rotary disk 30 are disposed at predetermined pitches along the circumferential direction. When the rotary disk 30 rotates in the feeding rotating direction, the picking-up members 33 hold and pick up the coins one by one to the upper region on the rotary disk 30.

The delivery disk 32 is arranged to deliver the coins picked up to the upper region on the rotary disk 30 by the picking-up members 33 to the deposit transport unit 22 one by one.

Next, the deposit transport unit 22 includes a deposit transport path 36 formed from the front side to the rear side at the left side upper portion of the main body unit 14. This deposit transport path 36 is flush with the surface of the rotary disk 30 and is inclined so that the left side becomes higher and the right side becomes lower as viewed from the front face of the machine body 12 similar to the inclination of the rotary disk 30.

Along the deposit transport path 36, a deposit transporting belt 38 is disposed by pulleys 37 disposed at the start end portion and the terminal end portion of the deposit transport path 36. The deposit transporting belt 38 rotates in the transporting direction to transport coins from the start end to the terminal end of the deposit transport path 36 by driving the pulleys 37 by motors. On the surface of the deposit transporting belt 38 opposed to the path surface of the deposit transport path 36, projections not shown which push and transport coins one by one are provided so as to project at predetermined pitches along the belt longitudinal direction.

The rotation of the deposit transporting belt 38 and coin feeding by the rotary disk 32 and the delivery disk 30 of the feeding unit 21 are interlocked with each other, and coins fed from the feeding unit 21 are received one by one between projections adjacent to each other of the deposit transporting belt 38.

In the deposit transport path 36, the recognition unit 23 and the plurality of sorting units 24 are disposed in order along the transporting direction from the front side to the rear side.

Next, the recognition unit 23 detects materials and diameters, etc., of coins to be transported in the deposit transport path 36, and recognizes whether the coins are acceptable into the machine body 12 and denominations, etc., of acceptable coins.

Next, among the plurality of sorting units 24, a sorting unit 24 positioned at a sorting position on the most upstream side in the transporting direction of the deposit transport path 36 is a rejected coin sorting unit 24 which sorts coins unacceptable into the machine body 12, and the sorting units 24 at a plurality of sorting positions on the more transportation downstream side are denomination-specific sorting units 24 which sort coins acceptable into the machine body 12, and all sorting units are formed to have the same structure.

In each sorting unit 24, a sorting hole 41 enabling coins to be sorted is formed on the path surface of the deposit transport path 36, and a gate 42 which opens and closes the sorting hole 41 is disposed. This gate 42 allows coins being transported in the deposit transport path 36 to pass through when the gate 42 is at a coin passing position at which the gate 42 closes the sorting hole 41, and sorts coins being transported in the deposit transport path 36 into the sorting hole 41 when the gate 42 is at a coin sorting position at which the gate 42 opens the sorting hole 41. The gate 42 is forcibly switched between the coin passing position and the coin sorting position by electric driving units 43 (refer to FIG. 10) such as solenoids or motors.

Coins sorted by the rejected coin sorting unit 24 are guided to a reject port 17 by a chute not shown. Coins sorted by the denomination-specific sorting units 24 are stored in the coin storing units 25 disposed corresponding to the sorting units 24 below the sorting units 24.

Figure 5:
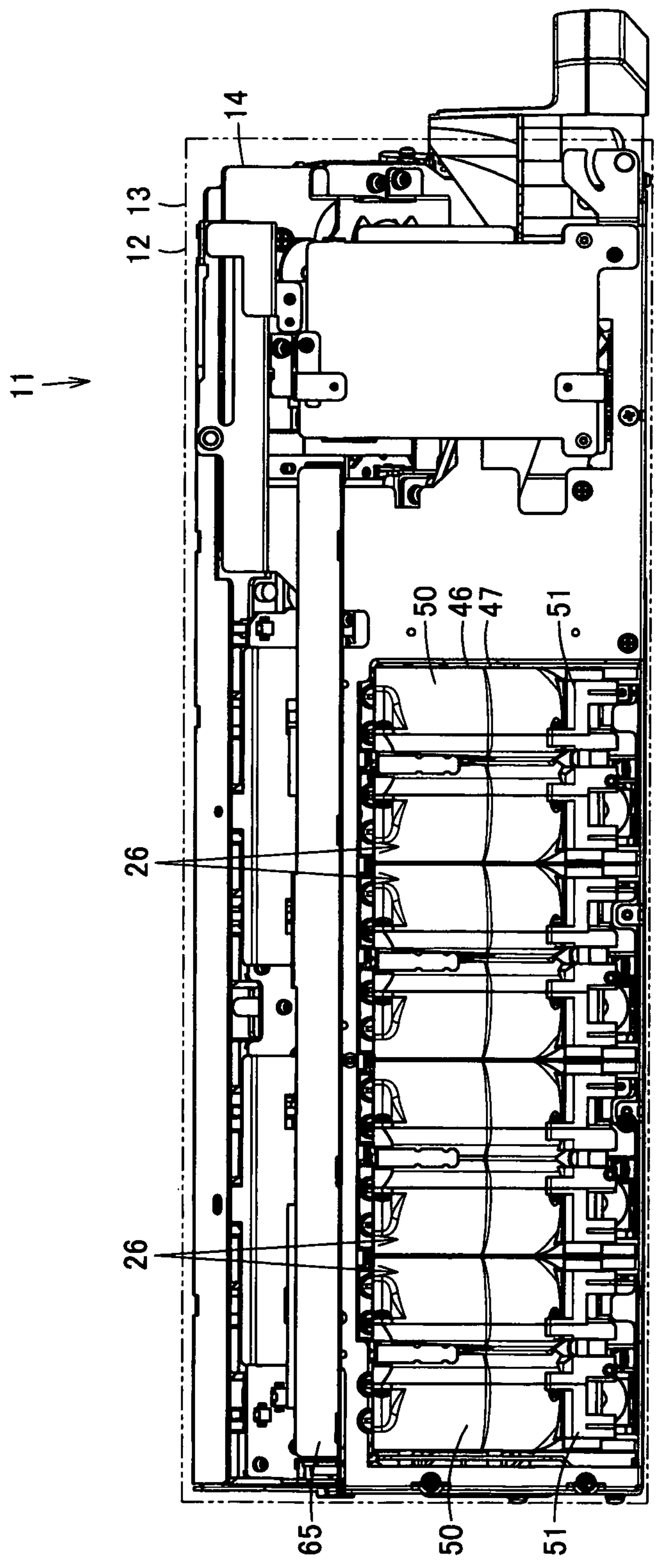
FIG. 5 is a side view showing the internal structure of the same coin handling machine.

Next, the stackers 26 are arranged in the front-rear direction inside a stacker housing unit 46 formed in the region below the deposit transport unit 22 of the main body unit 14. As shown in FIG. 5, the stacker housing unit 46 has an attaching and detaching port 47 opened in the left side face as one side face of the main body unit 14, and the stackers 26 are individually attachable and detachable via the attaching and detaching port 47.

As shown in FIG. 1 to FIG. 5, on each stacker 26, a storing frame 50 forming two coin storing units 25 is formed on the upper portion, and on the lower portion, ejection mechanisms 51 which eject coins one by one from the coin storing units 25 are disposed.

In the storing frame 50 of the stacker 26, a partitioning member 52 which partitions the interior of the storing frame 50 into two is formed, and by this partitioning member 52, two coin storing units 25 which store coins not aligned are formed. On the upper surfaces of the coin storing units 25, receiving ports 53 which receive coins sorted by the sorting units 24 of the deposit transport units 22 positioned above the coin storing units 25 are formed.

In the present embodiment, four stackers 26 are used, and the lateral widths W of all stackers 26 are formed to be equal to each other. As lateral widths of the coin storing units 25 of the stackers 26, three widths including a lateral width W1 for a small capacity (for coins with a small diameter and small thickness), a lateral width W2 for a medium capacity (for coins with a medium diameter and medium thickness), and a lateral width W3 for a large capacity (for coins with a large diameter and large thickness) are set, and these satisfy the relationship of W1<W2<W3. As kinds of the stackers 26, two kinds of stackers including a stacker 26 which includes a coin storing unit 25 with a lateral width W1 for a small capacity and a coin storing unit 25 with a lateral width W3 for a large capacity, where the capacities of the two coin storing units 25 are different from each other, and a stacker 26 which includes two coin storing units 25 with a lateral width W2 for a medium capacity, where the capacities of the two coin storing units 25 are the same, are used. The coin storing units 25 with these capacities are assigned by considering the coin diameters and thicknesses or assigned corresponding to handling amounts of coin denominations. For example, to coins with a large diameter or a large thickness or a coin denomination the handling amount of which is large, the coin storing unit 25 having a wide lateral width W3 and a large capacity is assigned, and to coins with a small diameter or a small thickness or a coin denomination the handling amount of which is small, the coin storing unit 25 with a narrow lateral width W1 and a small capacity is assigned, and to coins with a medium diameter or a medium thickness or a coin denomination the handling amount of which is neither large nor small, the coin storing unit 25 with a medium lateral width W2 and a medium capacity is assigned.

In the stacker housing unit 46, four stacker housing positions at which the four stackers 26 can be housed are provided.

The stackers 26 are detachably attached to the stacker housing positions of the stacker housing unit 46 by the same attaching unit. The attaching unit is not shown, and for example, rails are disposed along the attaching and detaching directions of the stackers 26 at the stacker housing positions of the stacker housing unit 46, groove portions which slidably engage with the rails are formed on the stackers 26, and by engaging the groove portions of the stackers 26 with the rails, the positions of the stackers 26 in the front-rear direction of the stacker housing unit 46 are determined, and by sliding the stackers 26 along the rails, the stackers can be attached to or detached from the stacker housing unit 46. The relationship between the rail and the groove portion may be reversed, and the attaching structure is not limited to the rail and the groove portion, and other structures may be used.

When each stacker 26 is housed at any stacker housing position of the stacker housing unit 46, the position of each sorting unit 24 of the deposit transport unit 22 positioned above the stacker housing unit 46 and the position of the receiving port 53 of each coin storing unit 25 of each stacker 26 are matched with each other by the attaching unit, and coins sorted by each sorting unit 24 can be received into each coin storing unit 25.

The ejection mechanism 51 of the stacker 26 includes an eject belt 57 disposed on the bottom portion of the coin storing unit 25 of the storing frame 50, and coins in the coin storing unit 25 are supported on the upper surface of the eject belt 57, and coins in the coin storing unit 25 are ejected to the dispensing transport unit 27 by rotation of the eject belt 57. On the right side surface of the ejection mechanism 51 opposed to the dispensing transport unit 27, a coin eject port 58 for ejecting coins in the coin storing unit 25 by the eject belt 57 is formed.

Near the inside of the coin eject port 58 above the eject belt 57, a reverse roller 59 which restricts coins ejected by the eject belt 57 one by one by rotating in a direction opposite to the transporting direction of the eject belt 57 is disposed. At a position closer to the coin eject port 58 than the reverse roller 59, a stopper mechanism 60 enabling restriction of coin ejection and a sensor 61 which counts the number of coins ejected from the coin eject port 58 are disposed.

Next, the dispensing transport unit 27 includes a dispensing transporting belt not shown disposed along the front-rear direction of the main body unit 14, and places coins ejected from the coin eject ports 58 of the plurality of coin storing units 25 on the dispensing transporting belt and transports the coins to the coin dispensing outlet 16 ahead.

Figure 6:
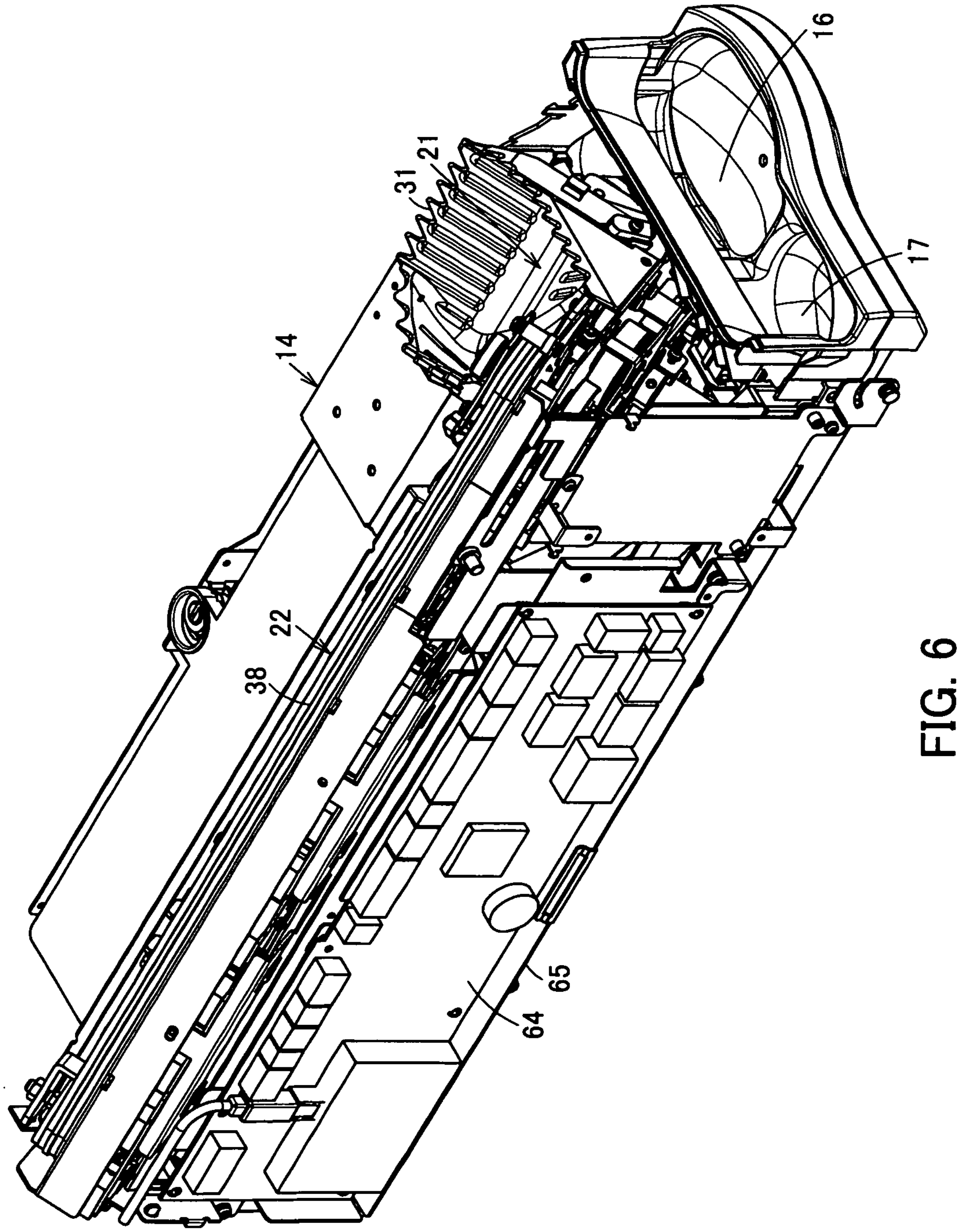
FIG. 6 is a perspective view showing a substrate positioned on the side to and from which the stackers are attached and detached of the same coin handling machine.
Figure 7:
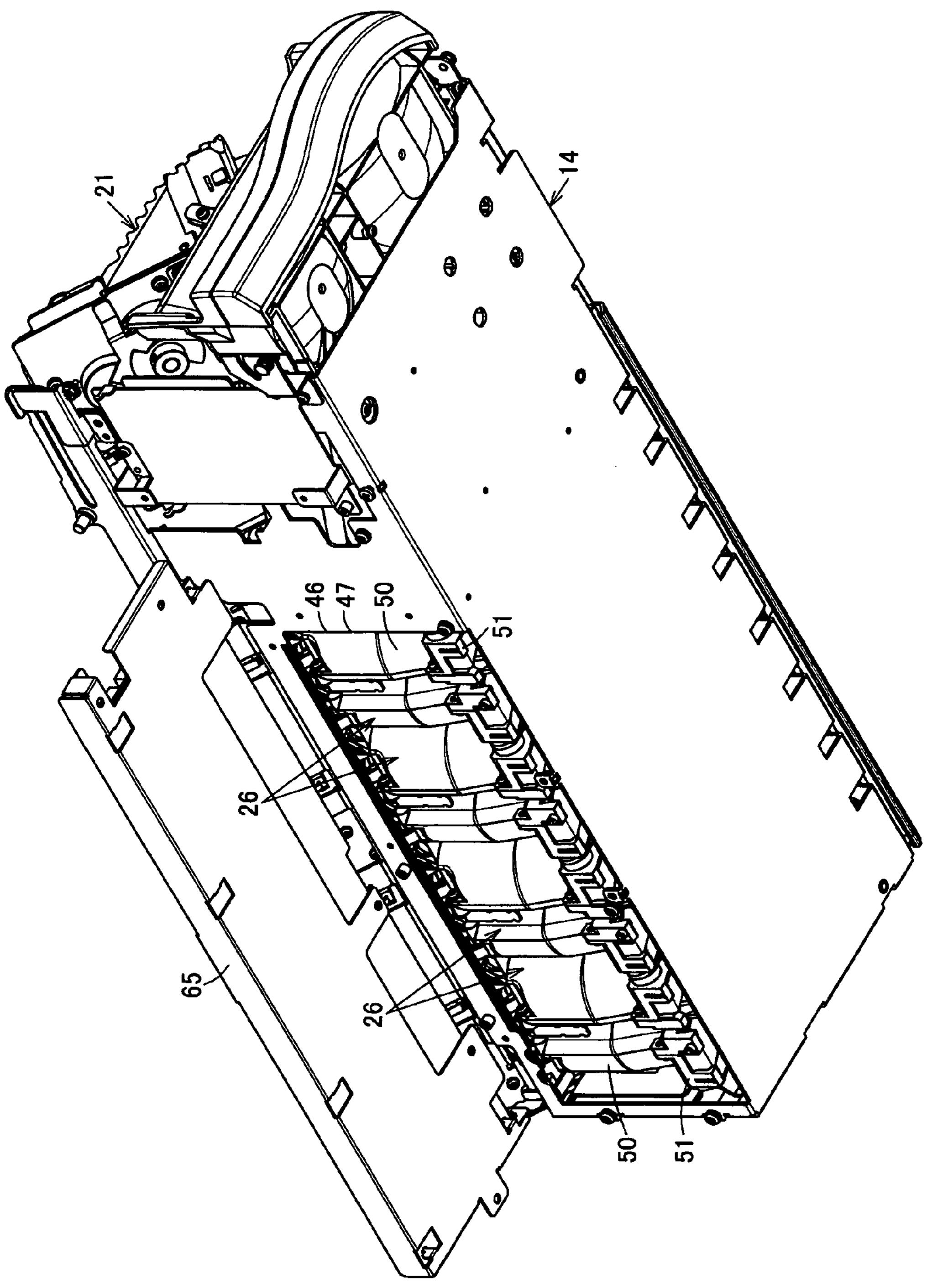
FIG. 7 is a perspective view of a state where the substrate of the same coin handling machine is withdrawn as viewed from the bottom surface side.
Figure 8:
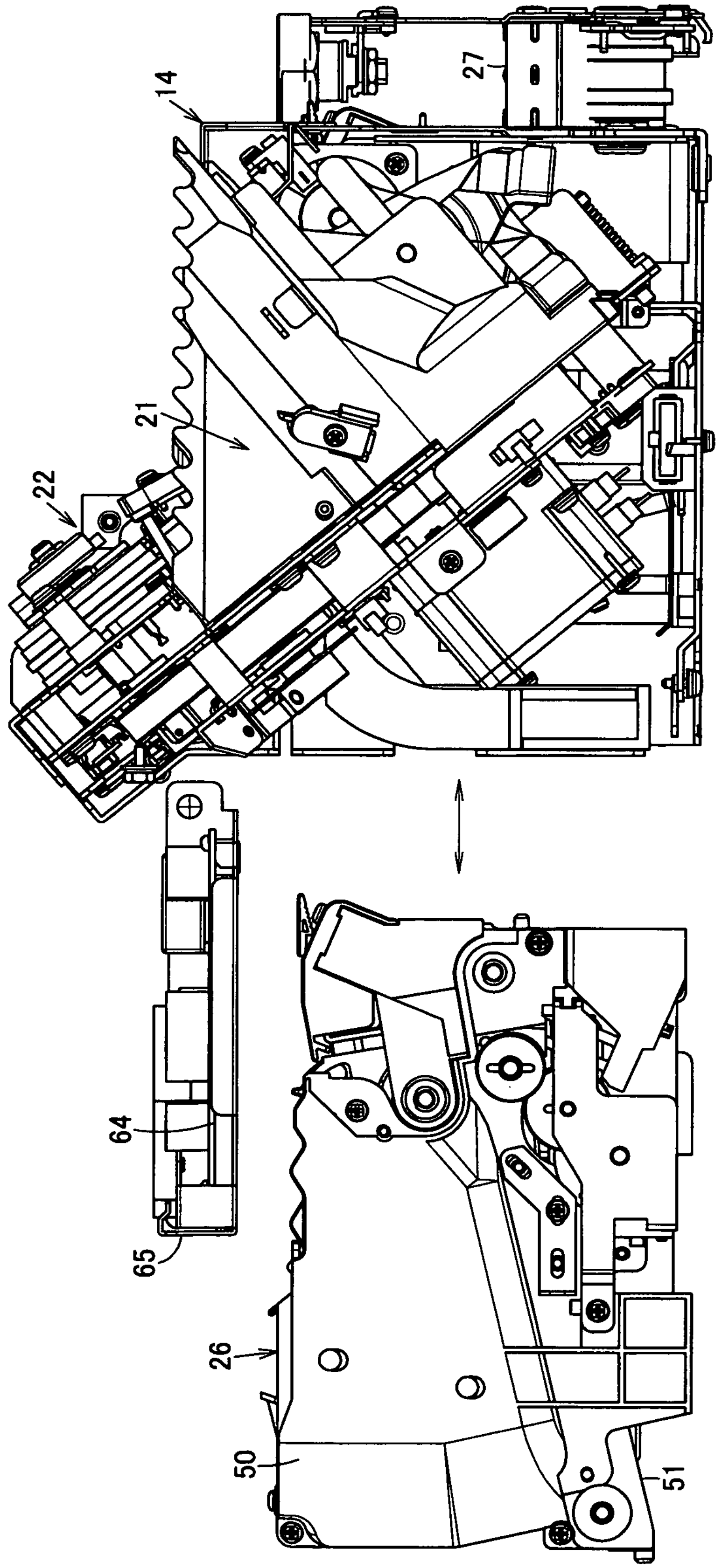
FIG. 8 is a front view of a state where the stacker is attached to and detached from the same coin handling machine.

As shown in FIG. 2 and FIG. 6 to FIG. 8, on the left side face of the main body unit 14, a plate 65 to which a substrate 64 is attached as a component is disposed. This plate 65 is attached to the main body unit 14 rotatably by using the upper portion as a pivot, and as shown in FIG. 6, in the state where the plate 65 is disposed along the left side face of the main body unit 14, the substrate 64 and the plate 65 cover the attaching and detaching port 47 of the stacker housing unit 46, however, as shown in FIG. 7 and FIG. 8, by opening the plate 65 by rotatably moving it upward, the substrate 64 and the plate 65 withdraw from the attaching and detaching port 47 of the stacker housing unit 46 and enable attachment and detachment of the stackers 26. The substrate 64 and the main body unit 14 are connected by a flexible substrate.

Figure 10:
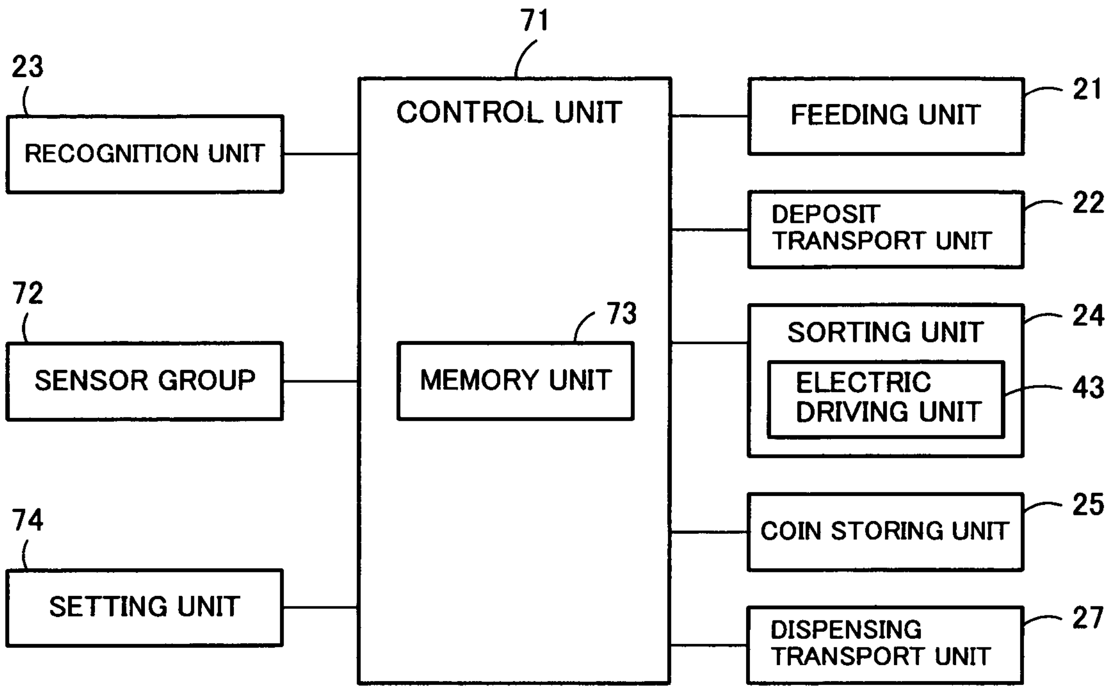
FIG. 10 is a block diagram of the same coin handling machine.

Next, FIG. 10 is a block diagram of a coin handling machine 11, and the reference numeral 71 denotes a control unit which controls the whole coin handling machine 11. This control unit 71 is provided on the substrate 64.

Into the control unit 71, signals are input from the recognition unit 23 and a sensor group 72 including various sensors for detecting coins at the respective positions inside the coin handling machine 11. The control unit 71 controls the feeding unit 21, the deposit transport unit 22, the sorting units 24, the ejection mechanisms 51 and the stopper mechanisms 60 of the stackers, and the dispensing transport unit 27, etc.

The control unit 71 includes a memory unit 73 which stores correspondences between the sorting units 24 and coin sorting denominations, and has a function to make the sorting units 24 sort coins being transported by the deposit transport unit 22 according to results of recognition by the recognition unit 23 based on the correspondences between the sorting units 24 and the coin sorting denominations stored in this memory unit 73.

The control unit 71 includes a setting unit 74 which sets correspondences between the sorting units 24 and the coin sorting denominations. This setting unit 74 may individually set coin sorting denominations for the sorting units 24, or when several patterns of correspondences between the sorting units 24 and the coin sorting denominations have already been registered in the memory unit 73, the setting unit 74 selects and sets a pattern, and in this case, the correspondences between the plurality of sorting units 24 and the coin sorting denominations can be easily set. Alternatively, information on sorts to be stored in the coin storing units 25 of the stackers 26 is provided by an IC tag, etc., and the information on the sorts to be stored in the coin storing units 25 of the stackers 26 is read by the main body unit 14 housing the stackers 26, and the correspondences between the sorting units 24 and the coin sorting denominations are automatically set.

Next, operation of the coin handling machine 11 of the present embodiment will be described.

First, a depositing operation will be described.

Coins input into the coin inlet 15 are received in the feeding unit 21. In the feeding unit 21, in response to start of a depositing operation, the rotary disk 30 and the delivery disk 32 rotate, and coins are picked up one by one by picking-up members 33 projecting from the surface of the rotary disk 30, and fed one by one to the deposit transport path 36 of the deposit transport unit 22 by the delivery disk 32.

In the deposit transport unit 22, the deposit transporting belt 38 rotates, and coins fed one by one from the feeding unit 21 into the deposit transport path 36 are transported while being pushed by the projections of the deposit transporting belt 38.

Coins to be transported in the deposit transport path 36 are recognized by the recognition unit 23.

As a result of recognition by the recognition unit 23, when a coin is unacceptable into the machine body 12, that is, a rejected coin, the rejected coin is sorted from the deposit transport path 36 by the rejected coin sorting unit 24 positioned on the most upstream side in the transporting direction of the deposit transport path 36 and returned to the reject port 17.

As a result of recognition by the recognition unit 23, when a coin is a normal coin acceptable into the machine body 12, the coin is transported to the position of the sorting unit 24 of the corresponding sort set in advance and sorted from the deposit transport path 36 to the coin storing unit 25.

The coins sorted by the denomination-specific sorting units 24 drop from the receiving ports 53 of the coin storing units 25 of the corresponding sorts into the coin storing units 25, and are stored on the eject belts 57 or on coins which have already been stored.

When no coin is recognized by the recognition unit 23 for a predetermined time, it is judged that handling of coins input into the coin inlet 15 has been completed, and driving of the feeding unit 21 and the deposit transport unit 22 is stopped and the depositing operation is ended.

Next, a dispensing operation will be described.

For example, in response to a signal of a dispensing command from the POS register, in the coin storing unit 25 storing coins of the corresponding sort to be dispensed, by rotating the eject belt 57 and rotating the reverse roller 59 reversely, the coins not aligned on the eject belt 57 are ejected one by one from the coin eject port 58. Based on detection by the sensor 61, when the number of ejected coins of the corresponding sort reaches the number of coins to be dispensed, ejection of the coins is forcibly stopped by the stopper mechanism 60.

The coins ejected from the coin eject port 58 of the coin storing unit 25 are dispensed to the coin dispensing outlet 16 by the dispensing transport unit 27.

In this coin handling machine 11, stackers 26 each having two coin storing units 25 the capacities of which are different from each other are used, and coins sorted by the plurality of sorting units 24 using the electric driving units 43 are stored in the coin storing units 25 of the stackers 26, and therefore, the coin storing units 25 can be freely set according to the diameters and thicknesses of coins and handling amounts of coin denominations, so that the capacities of the coin storing units 25 can be properly and effectively used without an increase in the size of the machine.

Specifically, to coins with a large diameter or thickness or coins of a sort the handling amount of which is large, a coin storing unit 25 with a wide lateral width W3 and a large capacity is assigned, and accordingly, capacity shortage can be prevented from occurring, and on the other hand, to coins with a small diameter or thickness or coins of a sort the handling amount of which is small, a coin storing unit 25 with a narrow lateral width W1 and a small capacity is assigned, and accordingly, the capacity can be prevented from becoming excessive. Therefore, without increasing the capacities and sizes of all coin storing units according to coins with a large diameter or thickness or coins of a sort the handling amount of which is large and increasing the size of the machine, the capacities of the coin storing units 25 can be properly and effectively used.

The sorting units 24 sort coins by using electric driving units 43, so that the coin denominations to be sorted by the sorting units 24 can be freely set and changed.

For example, by setting coins of a sort the handling amount of which is large to the sorting unit 24 and the coin storing unit 25 close to the front side of the main body unit 14, the transporting distance for depositing and dispensing the coins can be shortened, the handling time can be shortened, and the rate of incidence of transportation abnormality can be reduced.

To change the coin denominations to be sorted by the sorting units 24, the correspondences between the sorting units 24 and the coin sorting denominations are set by the setting unit 74, and the positions of the stackers 26 are changed so that the stackers 26 are exchanged with each other and the coin storing units 25 of the stackers 26 after being exchanged correspond to the changed coin sorting denominations of the sorting units 24, or according to the circumstances, the stackers are replaced with other stackers 26.

To exchange the stackers 26 with each other, first, the main body unit 14 is drawn out from the frame body 13. In the state where the main body unit 14 is drawn out, the deposit transport unit 22 is positioned above the stacker housing unit 46, the dispensing transport unit 27 is positioned on the right of the stacker housing unit 46, and the substrate 64 and the plate 65 are positioned so as to cover the left side of the stacker housing unit 46, that is, cover the attaching and detaching port 47 as shown in FIG. 6. Without removing the deposit transport unit 22 and the dispensing transport unit 27, as shown in FIG. 7 and FIG. 8, the substrate 64 and the plate 65 are rotatably moved upward and withdrawn, and the attaching and detaching port 47 of the stacker housing unit 46 is exposed, and accordingly, the stackers 26 to be exchanged are individually drawn out from the stacker housing positions of the stacker housing unit 46, and the stackers 26 to be exchanged are inserted and housed in the vacant stacker housing positions of the stacker housing unit 46.

At this time, all stackers 26 have the same width, and are individually attachable to and detachable from the stacker housing unit 46, so that stackers 26 which do not need to be changed are left as they are, and only stackers 26 which need to be changed are detached and attached, so that the workability is excellent.

Even when the positions of the stackers 26 are changed, by changing the correspondences between the stackers 26 and the sorting units 24 concurrently, the coins do not need to be taken out and the stackers 26 can be moved while storing coins in the coin storing units 25, so that the workability is high.

Further, the stackers 26 are detachably attached to the stacker housing positions of the stacker housing unit 46 by the same attaching unit. For example, at the stacker housing positions of the stacker housing unit 46, rails are disposed along the attaching and detaching direction of the stackers 26, and on the stackers 26, groove portions which slidably engage with the rails are formed. Therefore, when each stacker 26 is housed at any stacker housing position of the stacker housing unit 46, the position of each sorting unit 24 of the deposit transport unit 22 positioned above the stacker housing unit 46 and the position of the receiving port 53 of each coin storing unit 25 of each stacker 26 are matched with each other by the attaching unit, and coins sorted by each sorting unit 24 can be received in each coin storing unit 25.

By thus setting the correspondences between the sorting units 24 and the coin sorting denominations by the setting unit 74 and changing the positions of the stackers 26, the positional relationship between the sorting units 24 and stackers 26 and the coin sorting denominations can be easily changed without taking out coins being stored in the coin storing units 25 of the stackers 26.

Usually, the substrate 64 is disposed on the side of the attaching and detaching port 47 of the stacker housing unit 46 which the stackers 26 are attached to and detached from, and the limited space inside the machine body 12 can be effectively used. When attaching or detaching the stackers 26, the substrate 64 is rotatably moved and withdrawn together with the plate 65, and the stackers 26 can be attached to or detached from the stacker housing unit 46.

As a configuration for withdrawing the substrate 64, without limiting to rotatable movement of the plate 65, the plate 65 may be slid with respect to the main body unit 14 or the plate 65 may be removed from the main body unit 14.

For example, the substrate 64 may be disposed on the upper face of the main body unit 14 so that nothing is disposed on the side of the attaching and detaching port 47 of the stacker housing unit 46.

The number of coin storing units 25 of the stacker 26 is not limited to two as long as the sorting units 24 of the deposit transport unit 22 and the coin storing units 25 correspond to each other, for example, three coin storing units 25 with a lateral width for a small capacity may be used, or three in total including one coin storing unit 25 with a lateral width for a medium capacity and two coin storing units 25 with a lateral width for a small capacity may be used.

Further, an operation using stackers 26 becomes possible because the stackers 26 are easily attached/detached and moved. For example, at the close of business, operations such as replacement with stackers 26 storing coins of denominations and amounts (for example, change fund) necessary for the next day, or replacement with empty stackers 26 and collection of all coins that have already been received are easily performed.

Further, an operation is easily realized in which stackers 26 are attachable and detachable, and by providing covers in an opening and closing manner so as to prevent coins from being taken out from the taken-out stackers 26 and attaching keys to lock the covers being closed, the taken-out stackers 26 are directly delivered to a person in charge of a company taking charge of cash-sending and sent to a bank.

Figure 11:
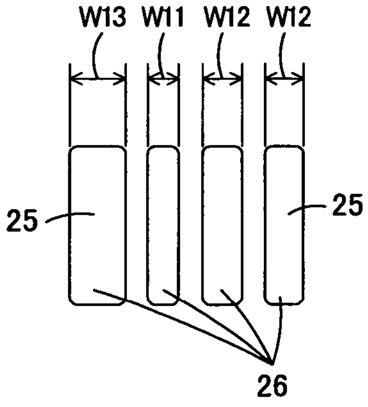
FIG. 11 is a plan view showing stackers of a coin handling machine according to a second embodiment of the present invention.

The stackers 26 each of which is provided with two coin storing units 25 are used, however, stackers 26 each of which is provided with one coin storing unit 25 may be used as in the second embodiment of FIG. 11.

These stackers 26 are of different types different in capacity from each other. Specifically, there are three kinds of stackers 26 including a stacker 26 provided with a coin storing unit 25 with a lateral width W11 for a small capacity (for coins with a small diameter and small thickness), a stacker 26 provided with a coin storing unit 25 with a lateral width W12 for a medium capacity (for coins with a medium diameter and medium thickness), and a stacker 26 provided with a coin storing unit 25 with a lateral width W13 for a large capacity (for coins with a large diameter and large thickness), and the relationship of W11<W12<W13 is satisfied.

The second embodiment has the same configuration as that of the first embodiment except for the configuration of the stackers 26.

Thus, even when stackers 26 each of which includes one coin storing unit 25 and coin storing units of different kinds with capacities different from each other are used, the coin storing units 25 with capacities corresponding to the diameters and thicknesses of coins or handling amounts of coin denominations can be set, and the capacities of the coin storing units 25 can be properly and effectively used without an increase in the size of the machine.

To change the coin denominations to be sorted by the sorting units 24, the correspondences between the sorting units 24 and the coin sorting denominations are set by the setting unit 74, and the positions of the stackers 26 are changed so that the stackers 26 are exchanged with each other and the coin storing units 25 of the stackers 26 after being exchanged correspond to the changed coin storing sorts of the sorting units 24.

In this case, the stackers 26 are individually attachable to and detachable from the stacker housing unit 46, so that stackers 26 which do not need to be changed are left as they are, and only stackers 26 which need to be changed are detached and attached, so that the workability is excellent. Moreover, when the positions of the stackers 26 are changed, it is unnecessary to take out coins in the coin storing units 25 of the stackers 26, so that the stackers 26 can be moved while the coins are stored in the coin storing units 25, so that the workability is excellent.

The lateral widths are different among the kinds of the stackers 26, however, even when each stacker 26 is housed at any position of the stacker housing unit 46, coins sorted by each sorting unit 24 can be received in the coin storing units 25 of each stacker 26 by setting a positional relationship in which the coin storing units 25 of each stacker 26 are positioned below each sorting unit 24 of the deposit transport unit 22 positioned above the stacker housing unit 46.

The method for attaching and detaching the stackers 26 is not limited to the method in which the stackers 26 are attached or detached by drawing out the main body unit 14 from the frame body 13, and a door is provided in an opening and closing manner on the left side surface of the frame body 13 and the stackers 26 are attached or detached by opening the door, or an opening to which the stackers 26 are exposed is provided on the left side surface of the frame body 13 and the stackers 26 are directly attached or detached from this opening. Further, without limiting to attachment and detachment sideward of the stackers 26 from the left side face of the main body unit 14, depending on the mechanism of the main body unit 14, the stackers 26 may be attached or detached from, for example, the upper face or back face of the main body unit 14.

The stacker 26 is not limited to a form in which the coin storing unit 25 and the ejection mechanism 51 are integrally provided, and the stacker 26 may have only the coin storing unit 25 and the ejection mechanism 51 may be provided on the main body unit 14.

The kinds of the stackers 26 or the coin storing units 25 are made recognizable by being color-coded. For example, all coin storing units 25 are color-coded, or the coin storing units 25 are color-coded based on the small, medium, and large capacities. By associating the colors and kinds of the coin storing units 25 with each other, they are easily managed.

This configuration of the stackers 26 can be applied not only to a coin handling machine having depositing and dispensing functions but also to a depositing machine having only a depositing function and a dispensing machine having only a dispensing function. In the case of a dispensing machine, the machine includes, in addition to the dispensing transport unit 27, as a supplementing function for sorting and supplementing supplementary coins by denomination to the coin storing units 25 of the stackers 26, the deposit transport unit 22, the recognition unit 23, and the sorting units 24, etc.

INDUSTRIAL APPLICABILITY

The present invention is applicable to automatic change dispensers connected to POS registers, coin depositing and dispensing machines which deposit and dispense coins, coin depositing machines which deposit coins, and coin dispensing machines which dispense coins, etc.

The invention claimed is:

1. A coin handling machine comprising:

a deposit transport unit which transports coins;

a recognition unit which recognizes coins to be transported by the deposit transport unit;

a plurality of sorting units provided along the deposit transport unit and having electric driving units, which sort coins being transported by the deposit transport unit according to results of recognition by the recognition unit;

a plurality of stackers each of which has two or more coin storing units with capacities different from each other for storing coins sorted by the sorting units corresponding to the sorting units; and a stacker housing unit which houses the plurality of stackers, wherein the plurality of stackers have the same lateral width of a direction along a transporting direction of the coin by the deposit transport unit and are individually attachable to and detachable from the stacker housing unit.

2. The coin handling machine according to claim 1, comprising:

an attaching unit which makes the stackers attachable to and detachable from the stacker housing unit, and positions receiving ports for receiving coins in the coin storing units in a state where the stackers are attached corresponding to the sorting units.

3. The coin handling machine according to claim 1, comprising:

a setting unit which sets correspondences between the sorting units and coin sorting denominations;

a memory unit which stores the correspondences between the sorting units and the coin sorting denominations set by the setting unit; and a control unit which makes the sorting units sort coins transported by the deposit transport unit according to results of recognition by the recognition unit based on the correspondences between the sorting units and the coin sorting denominations stored in the memory unit.

4. A coin handling machine comprising:

a plurality of stackers each of which has two or more coin storing units with coin storing capacities different from each other, and ejection mechanisms which allow coins stored in the respective coin storing units to be ejected;

a dispensing transport unit which receives and transports coins ejected from the coin storing units of the stackers; and a stacker housing unit which houses the plurality of stackers, wherein the plurality of stackers have the same lateral width of a direction along a transporting direction of the coin by the deposit transport unit and are individually attachable to and detachable from the stacker housing unit.

5. The coin handling machine according to claim 4, comprising:

a deposit transport unit which transports coins;

a recognition unit which recognizes coins to be transported by the deposit transport unit;

a plurality of sorting units provided along the deposit transport unit and having electric driving units, which sort coins being transported by the deposit transport unit corresponding to the coin storing units of the stackers according to results of recognition by the recognition unit;

and an attaching unit which enables the stackers to be detachably attached to the stacker housing unit, and positions receiving ports for receiving coins of the coin storing units in a state where the stackers are attached corresponding to the sorting units.

6. The coin handling machine according to claim 5, comprising:

a setting unit which sets correspondences between the sorting units and coin sorting denominations;

a memory unit which stores the correspondences between the sorting units and the coin sorting denominations set by the setting unit; and a control unit which makes the sorting units sort coins being transported by the deposit transport unit according to results of recognition by the recognition unit based on the correspondences between the sorting units and the coin sorting denominations stored in the memory unit.

* * * * *